United States Patent [19]

Ardini, Jr. et al.

[11] Patent Number: 4,918,693
[45] Date of Patent: Apr. 17, 1990

[54] APPARATUS FOR PHYSICALLY LOCATING FAULTY ELECTRICAL COMPONENTS

[75] Inventors: Joseph L. Ardini, Jr., Needham; Robert J. Allison, Jr., Medfield, both of Mass.

[73] Assignee: Prime Computer, Inc., Natick, Mass.

[21] Appl. No.: 149,595

[22] Filed: Jan. 28, 1988

[51] Int. Cl.[4] .............................................. G06F 11/22
[52] U.S. Cl. ................... 371/21.6; 364/265.3; 364/265.5; 364/267.4; 364/267.6; 371/16.5; 371/51.1
[58] Field of Search ........................ 371/15, 16, 20, 18, 371/49, 10, 5, 13, 21, 16.5, 51.1, 21.6

[56] References Cited

U.S. PATENT DOCUMENTS 3,814,922  6/1974  Nibby et al. ..................... 371/5 X
3,982,111  9/1976  Lerner et al. ................... 371/68 X
3,999,051 12/1976  Petschauer ........................ 371/10
4,468,731  8/1984  Johnson et al. ................ 371/10 X
4,621,364 11/1986  Tschoepe .......................... 371/38
4,637,019  1/1987  Rahimzad ......................... 371/16
4,809,276  2/1989  Lemay et al. .................. 371/40.1

Primary Examiner—Jerry Smith
Assistant Examiner—Stephen M. Baker
Attorney, Agent, or Firm—Wolf, Greenfield & Sacks

[57] ABSTRACT

In a computer system in which addressable components are physically organized on separately-replaceable printed circuit boards each containing an array of separately addressable components, diagnostic apparatus operates in the event of a component failure to assist a technician in physically locating the circuit board which contains the failed component. Each array includes a selection circuit which responds to component addresses located in the component array on that board. In the case of a component failure, diagnostic circuitry detects the address of the faulty component and places the address on the system address bus. The diagnostic circuitry controls each array to forward the output signal from the selection circuit on the associated printed circuit board to a register which has a position associated with each printed circuit board. Since only the selection circuit in the array which contains the faulty component responds to the address of the faulty component, the diagnostic register can be examined by the diagnostic circuitry to detect the position of the faulty board.

14 Claims, 2 Drawing Sheets

APPARATUS FOR PHYSICALLY LOCATING FAULTY ELECTRICAL COMPONENTS

FIELD OF THE INVENTION

This invention relates, in general, to computer diagnostic computer equipment and, in particular, to circuitry for locating faulty electrical components.

BACKGROUND OF THE INVENTION

Most digital computer systems contain built-in hardware and software routines which can detect and, sometimes, correct internal hardware failures. Generally, error correction is performed by means of error correcting codes. In accordance with conventional error correction schemes, a first error-correcting code word is computed from data which is stored or transmitted by means of a predetermined mathematical function. The first error-correcting code is then stored or transmitted along with the data. When the data is later retrieved or reaches its destination, a second error-correcting code is computed from the retrieved or transmitted data using the same mathematical function as was originally used to compute the first error-correcting code. The first code is compared to the second code and, if the codes are equal, then it is assumed that no errors in transmission or storage have occurred. If the codes are not equal, it is assumed that an error has occurred. In many cases, by an inspection of the differences between the codes, the location of the error can be detected and, in some cases, corrected.

Generally, when an error occurs in hardware, hardware diagnostic circuits generate error-correcting codes and place them in a portion of the computer's memory known as an "error log". For example, a common error correcting code is known as a "Hamming code". This code can be used not only to detect an error but also to correct single bit errors. In the case of a single bit error, diagnostic software records, in the error log, the Hamming code and the component address which was present on the address bus when the error occurred.

Failures can occur in memory boards, input devices, output devices, disk operating systems and even the CPU. If the failure is in a memory component, in addition to the address of the failed component, normally the bit position in the memory word which caused the failure is also recorded in the error log. This latter information is necessary due to the conventional construction of computer random-access memories (RAMs). More particularly, each memory array is typically comprised of a number of integrated circuit chips. Each chip contains a large number of memory locations and memory address circuitry which allows it to select and access one of the internal memory locations. However, each internal chip location generally holds only a single bit of information. Thus, a typical RAM integrated circuit chip may have 256,000 locations, each holding a single bit (designated as a 256K X 1 RAM chip). In order to construct a memory array of multiple-bit words (for example a 40 bit word) the plurality of RAM chips are stacked together to form an array. Thus, a 40 bit by 256K memory word 256K X 1 RAM chips. The address decoding circuitry on each chip is arranged so that corresponding memory locations are accessed in each chip to form a complete multiple-bit word. With this construction, each bit of the memory word is located in a different RAM memory chip so that the bit position of faulty memory word must be recorded in the error log along with the actual memory address If a single memory bit is in error, it is then corrected so that the data is correct. For multiple-bit errors the Hamming code and failure address is recorded in the error log, but generally multiple bit errors cannot be corrected.

Although the error log contains information regarding the failure address, bit position and error code, a problem often arises when a technician attempts to physically locate the printed circuit board on which the failed component resides. In order to do this the technician must know the actual address decoding scheme used on each printed circuit wiring board for the particular model of the computer under repair. Since address decoding schemes are often quite complicated, it is usually necessary for the technician to carry decoding tables for each computer system which he is expected to repair. The tables contain address ranges and the actual printed circuit boards on which each address range lies.

The decoding problem becomes further complicated if a memory component fails and there are several sizes of memory arrays in a single computer system. For example, different-sized memory boards may be used in order to precisely tailor the memory size to the customer's needs. In order for a technician to use decoding tables, it may be necessary for him to carry a set of tables for each model of machine which he is expected to repair.

In other systems, the memory decoding scheme may be established under control of the operating software at the time when the system is configured. Applicant's co-pending application Ser. No. 046457, filed May 4, 1987 is an example of such a system. In some software-configured systems, the decoding scheme is determined by the actual size of the memory array located on each board. However, other computers decode memory addresses on each board based on the board which contains the largest memory array. Consequently, it may not be possible for a technician to ascertain that a faulty memory chip is located on a particular board eve if he knows the range of memory addresses in which the faulty memory location resides. For such a system, memory tables cannot be used.

Thus, it is often difficult and time-consuming to physically locate the correct printed wiring board which contains the faulty component in order to replace the board and restore the system back to normal operation.

SUMMARY OF THE INVENTION

Accordingly, it is an object of the present invention to provide faulty component location apparatus which automatically detects and stores the physical position or slot at which the printed circuit board containing the failed component is located.

It is another object of the present invention to provide faulty component location apparatus which does not require the addition of extensive circuitry to the circuitry normally found in the system.

It is still a further object of the present invention to provide faulty component location apparatus which can temporarily or permanently remove the failed component from circuit operation until the failed component can be physically replaced.

It i still another object of the present invention to provide faulty component location apparatus which can operate entirely under software control.

It is yet another object of the present invention to provide faulty component location apparatus which utilizes portions of existing decoding circuitry in order to generate a signal which identifies physically the printed circuit board on which the failed component is located.

The foregoing objects are achieved and the foregoing problems are solved in one illustrative embodiment of the invention in which each mounting board with addressable locations includes a selection circuit which responds to addresses of the components located on that board. In the case of a component failure, diagnostic circuitry detects the address of the faulty component and places the address on the system address bus. The diagnostic circuitry controls each board to forward the output signal from the selection circuit on the associated printed circuit board to an error register which has a position associated with each printed circuit board. Since only the selection circuit on the board which contains the faulty component responds to the address of the faulty component, the error register can be examined by the diagnostic circuitry to detect and store in the error log the position of the faulty board.

More particularly, for the particular embodiment disclosed herein, use is made of the board select circuitry and parity check circuitry which is conventionally found on each printed wiring board. Added to this existing circuitry, per the present invention, is a multiplexer coupled in the parity error signal output line to alternatively couple either the parity signal or the board select signal. Under diagnostic control of the CPU, the board select signal which is normally generated for strictly intra-board purposes is substituted by a multiplexer on the parity error signal output line from the given board. Since a separate parity error signal is available for each printed wiring board, when the foregoing addition is made and the failed component address is placed on the address leads, a signal appears on the parity error lead corresponding to the printed circuit board on which the failed component is located.

Specifically, a multiplexer located on each printed wiring board and operating under control of diagnostic circuitry is used to select either the output of the address decoding circuitry or the output of the parity generator. The output of the multiplexer is connected to the parity error signal leads which are, in turn, connected to a parity error register located in a memory control circuit. The output of the parity error register can be read by the diagnostic circuitry in order to determine the printed circuit board position. The diagnostic circuitry stores the position information so that a technician can subsequently replace the faulty board.

DETAILED DESCRIPTION OF THE PREFERRED EMBODIMENT

Figure 1:
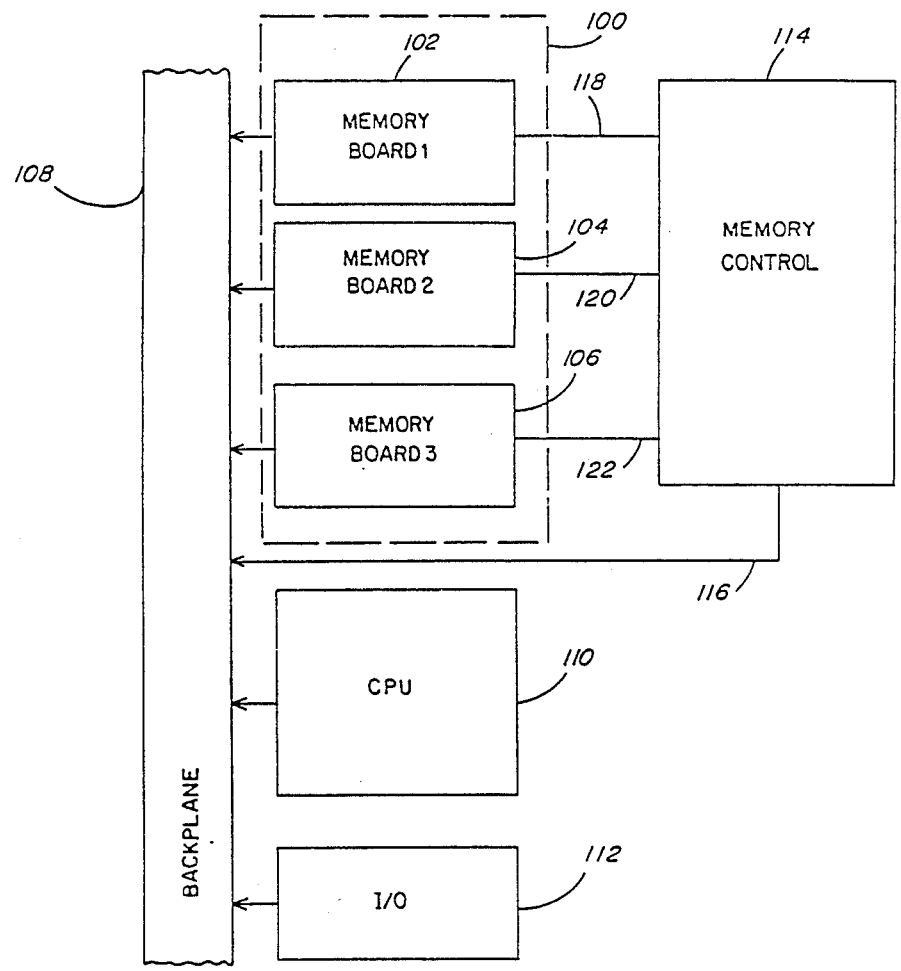
FIG. 1 shows a block schematic diagram of a prior art computer system typical of the type of system in which the invention can be used.

FIG. 1 is a schematic diagram of a portion of a computer system in which various system components are physically mounted on separate printed wiring boards. In such a system the printed wiring boards typically plug into a backplane 108 which is a large electrical chassis or back plate on which are mounted a plurality of conventional printed circuit board "edge" connectors, each of which comprises a "slot" for a printed circuit board. These connectors are electrically wired to power and ground and may also be connected together by means of multiple wire paths which form a computer bus.

One or more printed circuit wiring boards which comprise the main elements of the computer are plugged into the backplane at preassigned locations. For example, one or more printed circuit boards which together comprise the central processing unit (as represented by block 110) may be plugged into backplane 108. Similarly, input/output (I/O) circuits represented by block 112 maybe also be plugged into backplane 108.

Of particular interest is memory circuit 100 and memory control 114. Memory control 114 is typically a circuit which monitors and controls the memory and is plugged in by means of plug 116 into the backplane 108.

Main memory circuit 100 consists of a plurality of boards, of which boards 102-106 are shown. Several boards are typically used for a semiconductor main memory because the semiconductor memory requires a large number of integrated circuit chips which, in turn, occupy a large area. Thus, several boards must be used in order to make each board a manageable size. For example, in a typical main memory there may be eight boards which comprise the semiconductor main memory. Each of these boards contains a portion of the semiconductor memory.

As previously discussed, a problem arises when an addressable component in one of these boards fails and the board location must be determined by the technician which is repairing the system. In some machines, each of memory boards 102-106 contains the same size memory array. For example, board 102 may consist of an 8 megabyte section of memory, board 104 may consist of an 8 megabyte section of memory and board 106 may consist of an 8 megabyte section of memory for a total of 24 or more megabytes. Depending on the memory wiring scheme, the boards may be accessed sequentially in order to comprise the entire memory. Thus, board 106 may contain memory locations corresponding to addresses 0-8M (zero to 8 million), board 104 may contain addresses 8M-16M and board 102 may contain addresses 16M-24M. In such a system a failed memory component can be relatively easily located.

However, different computer systems may have different sized memory boards in each slot. For example, in another computer system, board 102 may be an 8 megabyte board, board 104 a 16 megabyte board and board 106 an 8 megabyte board.

The problem is further complicated in that some computer systems decode the memory addresses resident on the memory boards in each slot based on the size of the largest board in any of the slots. In such a system, if memory board 102 contains 8 megabyte memory array then the remaining slots will be decoded as if they contained 8 megabyte memory arrays whether they actually do or not. Thus, in such a system, if board 106 only contains a 4 megabyte memory array, then a 4 megabyte "hole" exists in the memory. Although the system can ignore this "hole" by appropriately mapping the addresses, it may not be obvious to the technician who is repairing the system that a succeeding memory section is physically resident on the next board.

Figure 2:
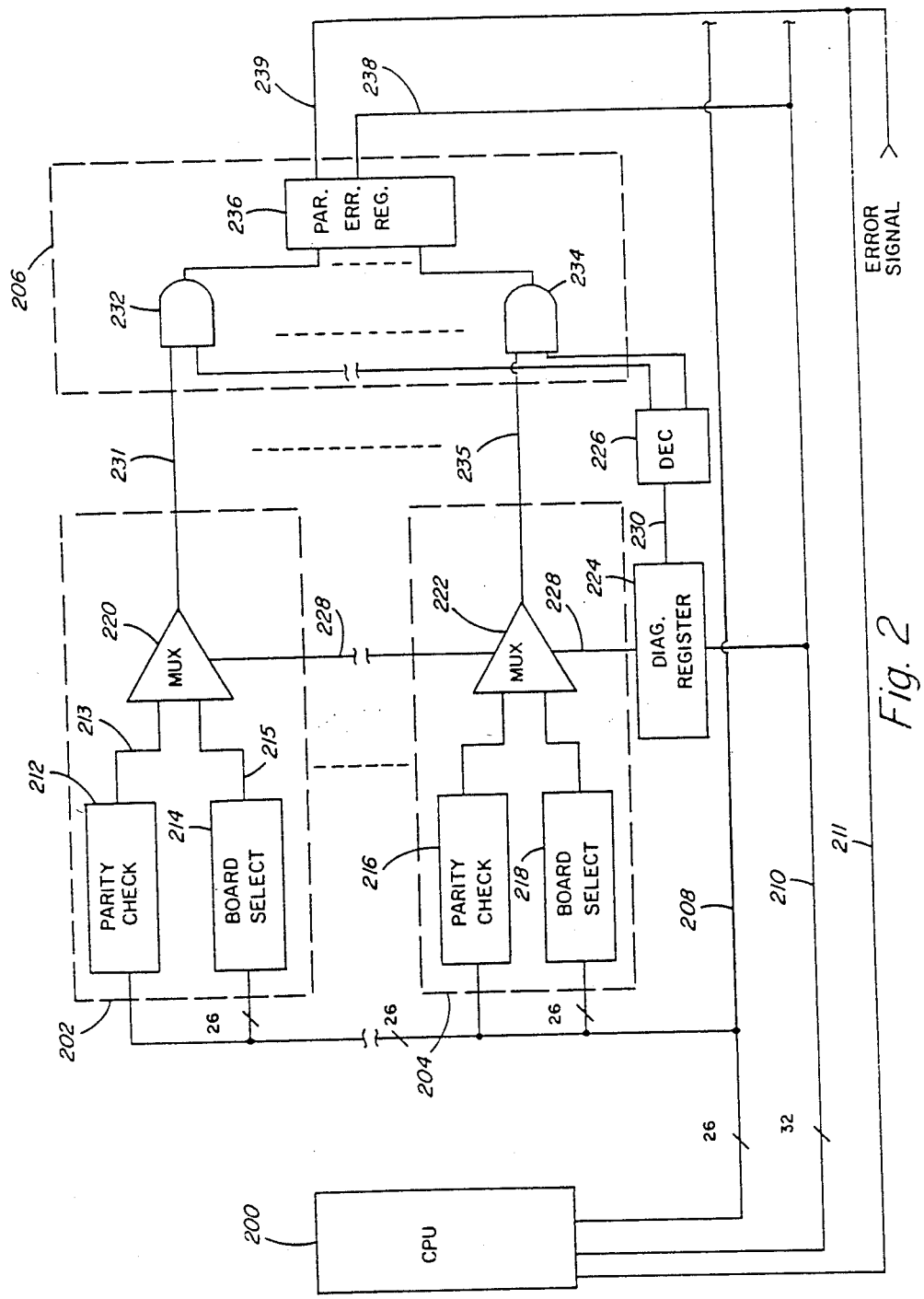
FIG. 2 is an electrical block schematic diagram of circuitry comprising one illustrative embodiment of the invention.

FIG. 2 of the drawing shows a method of indicating to the technician on which of the printed wiring boards a defective memory component is physically located. FIG. 2 schematically shows a computer system in which central processing unit 200 is connected to main memory boards 202 and 204 and to memory controller 206 by means of address bus 208 and data bus 210. FIG. 2 specifically shows only two memory boards, but it is to be understood that the boards are representative examples of the inventive concept and that every field replaceable wiring board will contain the inventive elements. Normally, this will include additional memory boards, CPU boards, input device boards, output device boards, DOS boards, etc. Also, although buses 208 and 210 are shown as single wires, they each contain a plurality of signal paths or wires. For example, data bus 210 may contain 32 signal paths. Address bus 208 may contain also a plurality of signal paths of which 26 are depicted. These 26 wires are used to select a memory location in one of the memory boards 202-204.

Each of main memory boards 202-204 contains conventional circuitry which is not disclosed in detail herein in order to clarify the description of the invention. Only those portions of the memory board which are necessary for understanding of the invention have been shown in block diagram form. The remainder of the memory including the actual memory chips has been omitted for clarity but construction and operation of such a memory is well known.

On each board such as board 202, there is an address decoder circuit which checks if an address present on address bus 208 corresponds to a memory location which is located on that board. This circuit is shown schematically as the board select circuit 214 in memory board 20. Each memory board contains identical circuitry and thus only memory board 202 will be described in detail. For example, memory board 204 contains a circuit, 218, which is equivalent to board select circuit 214.

The board select circuit 214 receives address information from the 26 address lines and may also receive enable signals (not shown) which are used to generate a board select signal on output 215. This signal indicates that a memory location corresponding to the address on the address bus 208 exists on that board. In addition to the board select signal, board select circuit 214 typically produces bank select signals which selects sections or "banks" of the memory located on the corresponding printed wiring board.

The board select circuitry is conventionally found on each board of a semiconductor memory array and is used for various diagnostic purposes and for enabling the board during the normal operation of the circuit. Thus, the board select circuitry need not be added specifically for the purposes of the invention.

Also found on a typical memory board is a parity check circuit. For example, parity check circuit 212 is located on board 202 and parity check circuit 216 is located on board 204. In a conventional fashion, the parity check circuit examines a diagnostic code associated with each memory address in order to determine whether each data transfer operation results in correct transmission. If an error occurs during a memory read or write operation, the parity check circuit generates a parity error signal which is forwarded to the CPU as described in more detail below. In response to the parity error signal, the CPU runs through a diagnostic routine wherein it writes the address at which the parity error occurred into an "error log" portion of the memory. The error log can later be used by a technician for purposes of locating the faulty component.

The parity error signal discussed above is forwarded to central processing unit 200 by means of a parity error register 236 which is located in memory control 206. During the normal operation of the memory, the output of parity check circuit 212 is forwarded by means of lead 231 directly to parity error register 236. Parity error register 236 contains a register location corresponding to each of the wiring boards present in the system. Register 236 is connected to error control path 211 via leads 239 and to data bus 210 via leads 238. During normal operation of the memory, the output of parity check circuit 212 is forwarded by means of lead 231 directly to parity error register 236. Therefore when parity check circuit 212 detects an error it forwards an error signal to register 236 which places a bit (either a logic 1 or 0 depending on the selected convention) in the register cell corresponding to board 202. Register 236 then sends a signal to the CPU 200 via line 239 and control path 211 indicating that an error has been detected. CPU 200 then reads register 236 via data bus 210 and lines 238 and places the register word in the error log.

In accordance with the invention, the output of board select circuit 214 (which is normally only used internally within board 202) is provided to one input of multiplexer 220. The other input of multiplexer 220 is provided with the output of parity check circuit 212. The output of multiplexer 220 is connected to lead 231 which normally carries the parity error information directly to register 236. However, further in accordance with the invention, lead 231 is connected to one input of AND gate 232 and the other input of AND gate 232 is connected to the output of a decoder 226. Both multiplexer 220 and AND gate 232 are ultimately under control of a diagnostic register 224. Diagnostic register 224 is a register which can be loaded with diagnostic information by central processing unit 200 via data bus 210. Register 224 can be used to control various portions of the system to place the system in a diagnostic "mode" to obtain information if an error occurs or during routine maintenance.

Each of memory boards 202-204 (as well as every other field replaceable wiring board in the system) is provided with a multiplexer such as multiplexer 220. For example, board 204 is provided with a multiplexer 222 which is connected to the outputs of parity check circuit 216 and board select circuit 218.

The operation of the inventive component location circuit is as follows. During normal memory operation, central processing unit 200 loads diagnostic register 224 via data leads 210 with appropriate information so that the outputs of register 224 on lead 228 control multiplexers 220 and 222 to connect the output of parity circuits 212 and 216 to the corresponding leads 231 and 235. Diagnostic register 224 also controls decoder 226 by means of lead 230, causing decoder 226 to enable AND gates 232 and 234 during all normal operation. Thus, the outputs of parity check circuits 212 and 216 are provided to parity error register 236 which can be scanned by means of leads 238, and data bus 210 by central processing unit 200 in order to detect a memory error.

Errors other than address parity check errors may occur. Such possibilities include input or output errors, CPU errors, etc. When one of these errors is detected in the conventional fashion, an error signal is placed on control path 211. Thus, the control signal on line 211 to the CPU 200 may originate essentially either from a parity type error via line 239 or from several of the other types of errors that may occur as outlined above. In FIG. 2 the error signal is represented as a single signal but can, of course, be generated from a number of different error conditions as noted above. The address of the faulty location (eg. memory, input port, output port, etc.) is entered into the error log as previously mentioned. However, in response to the detection of the error, diagnostic software operating in central processing unit 200 causes new diagnostic information to be forwarded, via data bus 210, to diagnostic register 224. In the illustrated embodiment of FIG. 2, the register 224 controls multiplexors 220 and 222. Under control of diagnostic register 224 multiplexers 220 and 222 disconnect parity check circuits 212 and 216 from leads 231 and 235 and connect the output of board select circuits 214 and 218 to leads 231 and 235. Thus, the output of the board select circuits is forwarded to parity error register 236.

After changing the multiplexers, central processing unit 200 retrieves the address of the faulty memory location from the error log and places it o address bus 208. In accordance with its normal operation, the board select circuit in the printed wiring board which contains the faulty location will respond to the address of the faulty memory location by producing a board select signal. This board select signal is forwarded by the associated multiplexer to the section of the parity error register 236 which corresponds to the board on which the faulty memory location is located. For example, assume that the faulty memory location is located on board 202. In this case, board select circuit 214 will respond to the address signals of the faulty memory location which are present on address bus 208. Board 214 will produce a board select signal on its output 215 which will be forwarded, via multiplexer 220 and lead 231, through enabled gate 232 to parity error register 236.

After placing the address of the faulty memory location on address bus 208, central processing unit 200 then examines parity error register 236 to detect the register section in which the board select signal appears. Since each register position corresponds uniquely to a particular printed wiring board, the location or slot number of the board can be determined via the parity error register 236 to central processing unit 200 and entered into the error log along with the memory address of the failed component.

In conventional diagnostic operation, once the system recognizes an error, central processing unit 200 is often arranged to "map" a page or pages of the memory out of system operation so that no further errors are generated by that portion of memory. This "mapping" is performed by altering the normal translation between the memory addresses and the actual physical memory locations. In response to the detection of an error the translation is altered so that the system does not use a range of addresses which correspond to the faulty memory location. Thus, further errors generated by this location can be eliminated. However, in conventional systems if there is an error in the parity check circuit itself, then, even if memory pages or the entire board on which the parity checker is located is "mapped out" by the diagnostic software, the parity circuit may still generate erroneous signals which slow the operation of the system.

However, in accordance with the invention, once the slot number of the board which is generating errors is noted by central processing unit 200 as described above, the output of the associated parity check circuit can be disabled to eliminate the generation of further error signals.

For example, suppose that parity check circuit 212 on board 202 has become faulty so that it continuously generates a parity error signal on its output 213. CPU 200 can contain a diagnostic program that, after a certain number of parity error signals are received from board 202, will send a code to diagnostic register 224 by means of data bus 210 which instructs register 224 to disable the parity check circuit 212 output. This code is forwarded by means of leads 230 to decoder 226. In response to the code, decoder 226 generates a disable signal, which, in turn, disables AND gate 232. Disabled AND gate 232 effectively disconnects parity check circuit 212 from parity error register 236. Thus, even if parity check circuit 212 continuously generates parity errors, the errors will not be registered in register 236 and will not slow the operation of the system.

Although only one illustrative embodiment of the invention has been described in detail, other embodiments and modifications will be immediately obvious to those skilled in the art. For example, although the illustrative embodiment shows the output of the board select circuit being multiplexed with the output of the parity check circuit, the output of the board select circuit may be multiplexed with the output of a circuit other than the parity check circuit provided that the other circuit produces an output which is forwarded to a register which has unique position for each printed circuit board. Also, although the illustrative embodiment only shows two memory boards, the invention may be practiced with any number of memory boards, input/output boards or other computer units having field replaceable boards. Other similar modifications will be immediately apparent to those skilled in the art.

What is claimed is:

1. Apparatus for determining the physical location of a faulty computer component, for use with a computer system having separate data, address, and control signal buses and further having addressable components mounted on a plurality of physically separate mounting boards, said apparatus comprising, means for generating an error signal when an error is detected at a specific address, means responsive to the generation of said error signal for storing the address corresponding to the location causing said error signal in first storage means, means for placing said address corresponding to the location of said error on the address bus, means associated with each mounting board for generating a board select signal when an address which is physically located on that board is placed on the address bus, means responsive to the generation of said error signal and said board select signal for storing a signal in a second storage means for indicating the faulty mounting board.

2. Apparatus according to claim 1 wherein said second storage means contains a bit location corresponding to each separate mounting board in the computer system and which has an input line for each bit location, each input line being operatively connected to the output of the board select signal of the corresponding mounting board.

3. Apparatus according to claim 1 further comprising, means for selectively disabling said board select signals such that said board select signals do not reach said second storage means.

4. Apparatus for determining the physical location of a faulty component according to claim 1 wherein said means for generating an error signal comprises an error circuit on said board.

5. Apparatus for determining the physical location of a faulty component according to claim 4 wherein said multiplexer has a pair of inputs, one from said board select signal generating means and the other from said error circuit, the output of aid multiplexer coupled to said error storing means on the board.

6. In a computer system having a central processing unit, addressable components mounted on a plurality of physically separate mounting boards and separate data, address, and control signal busses connecting all components to the CPU, an apparatus for determining the physical location of a faulty computer component comprising:

a plurality of mounting boards, each board comprising:
(A) a plurality of computer components,
(B) a multiplexer having a plurality of inputs, a single output and control inputs,
(C) board select circuitry, having inputs which are connected to the address bus and a single output, said circuitry adapted to output a first signal when the address on the address bus is physically located on that board and a second signal otherwise,
(D) address parity check circuitry having inputs connected to the address bus and a single output, said circuitry adapted to output a first signal when it detects an address parity error and a second signal otherwise,
(E) the output of said board select circuitry connected to one input of said multiplexer,
(F) the output of said parity check circuitry connected to another input of said multiplexer;

a decoder having an output associated with each mounting board and a plurality of control inputs;
a diagnostic register for controlling said multiplexers and said decoder, the inputs of said diagnostic register connected to said data bus in order to receive instructions from said CPU and the outputs connected to said multiplexers control inputs and said decoder control inputs;
a memory controller comprising;
(A) a parity error register having a bit location associated with each mounting board and an input line and output line for each bit,
(B) an AND gate associated with each mounting board in the computer system, having two inputs,
(C) one of each of said AND gate inputs being connected to the output of the associated mounting board multiplexer and the other of each of said AND gate inputs being connected to the associated output of the decoder,
(D) the output of each of said AND gates being connected to the associated input of the parity error register,
(E) the output line for each bit of said parity error register connected to the data bus.

7. Apparatus for determining the physical location of a faulty electric component, said apparatus being for use with a computer system having components with addressable locations mounted on a plurality of physically separate mounting boards, and a means for generating address signals to select one of said plurality of locations, said apparatus comprising:
means responsive to the detection of an error associated with a board for generating an error signal,
means for receiving and storing said error signal,
means associated with each of said mounting boards and responsive to said address signals for generating a board select signal if said address signals select a location on that board,
first diagnostic control means responsive to the generation of said error signal for storing the address signals corresponding to the location causing said error signal, and
second diagnostic control means responsive to the generation of said error signal and said board select signal for storing a signal representative of the faulty board,
said first diagnostic control means using said stored address signals to reselect said location causing said error, said first diagnostic control means thereupon examining said signal representative of the faulty board to determine the faulty mounting board.

8. Apparatus for determining the physical location of a faulty component according to claim 7 wherein said second diagnostic control means comprises an error storing means, a control register for receiving diagnostic control information from said central processing unit and generating a diagnostic control signal, and a multiplexer responsive to said diagnostic control signal and having an input connected to said board select signal generating means and an output connected to said error signal storing means.

9. Apparatus for determining the physical location of a faulty component, said apparatus being for use with a computer system having various components mounted on a plurality of mounting boards, said computer system having a memory with a plurality of memory locations, sets of said memory locations being located on physically different mounting boards, and a means for generating address signals to select one of said plurality of memory locations, said apparatus comprising:
means for generating an error signal when an error is detected,
means for receiving and storing said error signal,
means located on each of said mounting boards and responsive to said address signals for generating a board select signal if said address signals select a memory location on that board,
first diagnostic control means responsive to the generation of an error signal for storing the address signals corresponding to the memory location causing said error signal, and
second diagnostic control means responsive to the generation of said error signals and said board select signal for storing a signal representative of the faulty board, said first diagnostic control means using said stored address signals to reselect said memory location causing said error, said first diagnostic control means thereupon examining said signal representative of the faulty board to determine the faulty mounting board.

10. Apparatus for determining the physical location of a faulty memory component according to claim 9 wherein said second diagnostic control means comprises an error storing means, a control register for receiving diagnostic control information from said means for generating address signals and generating a diagnostic control signal and a multiplexer responsive to said diagnostic control signal and having an input connected to said board select signal generating means and an output connected to said error signal storing means.

11. Apparatus for determining the physical location of a faulty memory component according to claim 10 wherein said means for generating and error signal comprises an error circuit on said board.

12. Apparatus for determining the physical location of a faulty memory component according to claim 10 wherein said multiplexer has a pair of inputs, one from said board select signal generating means and the other from said error circuit, the output of said multiplexer coupled to said error storing means on the board.

13. Apparatus for determining the physical location of a faulty memory component according to claim 9 wherein said error signal receiving and storing means comprises an error signal register.

14. Apparatus for determining the physical location of a faulty board in a computer system that has a plurality of boards, said computer system having a memory and a central means for generating address signals, said apparatus comprising: means for generating an error signal representative of a fault in a mounting board, means for storing said error signal, means responsive to said error signal for storing the address signal corresponding to the location causing said error signal, means located on each of said boards and responsive to said address signal for generating a board select signal, and means responsive to said board select signal for storing a signal representative of the faulty board, said means for storing the address signals reapplying the address signals to all boards for the purpose of determining the faulty board.

* * * * *